No. 806,301. PATENTED DEC. 5, 1905.
F. SPLITTSTOSER.
POISON DISTRIBUTER.
APPLICATION FILED MAR. 21, 1904.

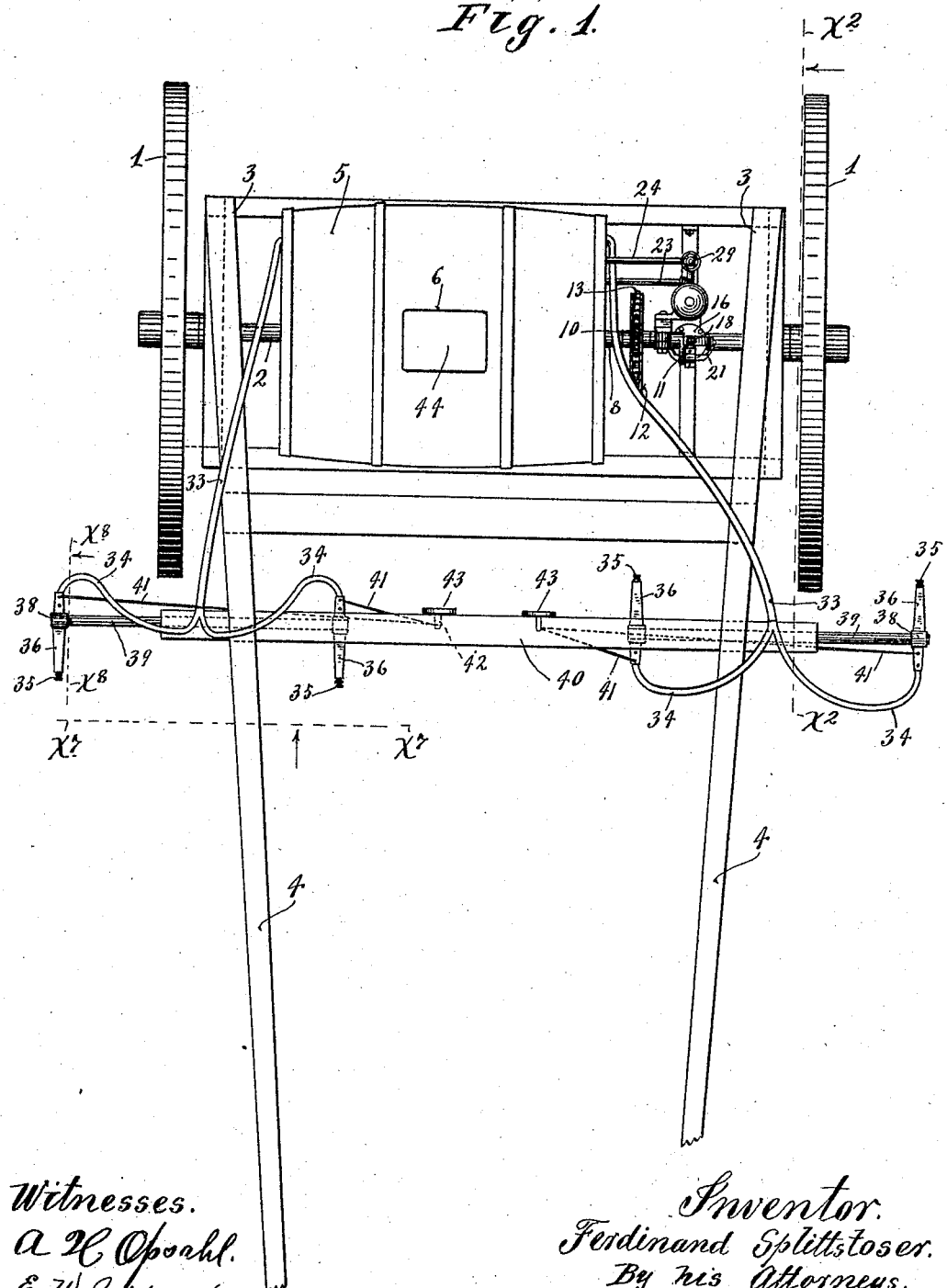

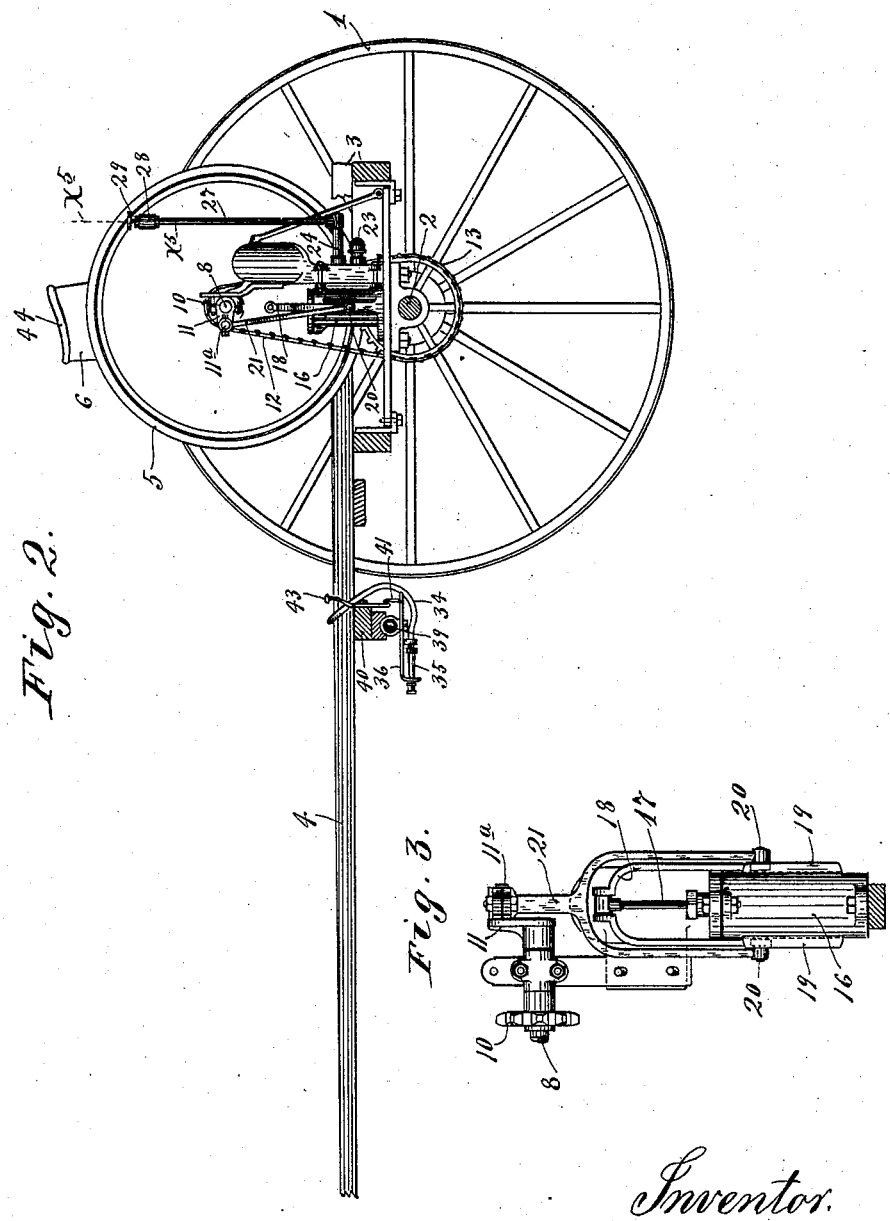

3 SHEETS—SHEET 3.

Witnesses.
A. H. Opsahl.
E. W. Jeppesen.

Inventor.
Ferdinand Splittstoser
By his Attorneys
Williamson Merchant

UNITED STATES PATENT OFFICE.

FERDINAND SPLITTSTOSER, OF NORTHBRANCH, MINNESOTA.

POISON-DISTRIBUTER.

No. 806,301. Specification of Letters Patent. Patented Dec. 5, 1905.

Application filed March 21, 1904. Serial No. 199,222.

*To all whom it may concern:*

Be it known that I, FERDINAND SPLITT-STOSER, a citizen of the United States, residing at Northbranch, in the county of Chisago and State of Minnesota, have invented certain new and useful Improvements in Poison-Distributers; and I do hereby declare the following to be a full, clear, and exact description of the invention, such as will enable others skilled in the art to which it appertains to make and use the same.

My present invention relates to poison-distributers for spraying potatoes and various other plants with a liquid poison, and has for its object to improve the same in the several particulars hereinafter named.

To such ends the invention consists of the novel devices and combinations of devices hereinafter described, and defined in the claims.

The invention is illustrated in the accompanying drawings, wherein like characters indicate like parts throughout the several views.

Figure 4:
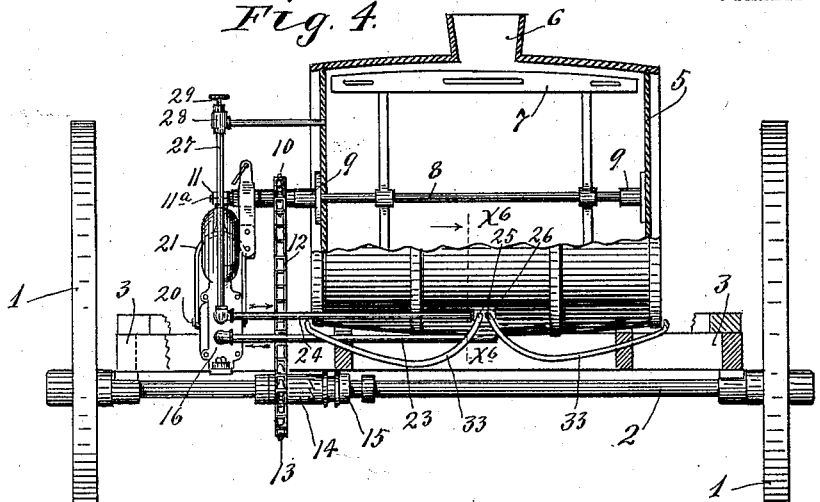
Figure 5:
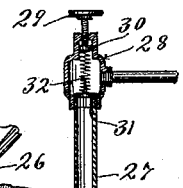
Figure 6:
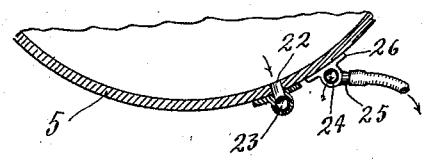
Figure 7:
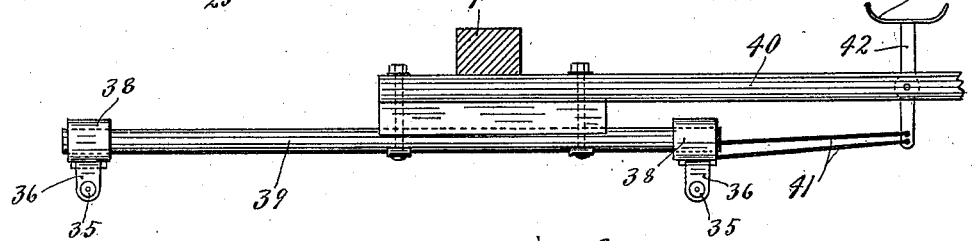
Figure 8:
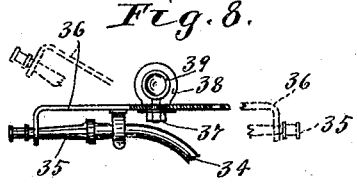
Figure 9:
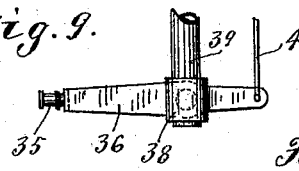

Figure 1 is a plan view of the improved machine. Fig. 2 is a vertical longitudinal section approximately on the line $x^2$ $x^2$ of Fig. 1. Fig. 3 is a detail in rear elevation of the pump and its connections. Fig. 4 is a rear elevation of the machine with some parts broken away and with some parts sectioned. Fig. 5 is a detail in section on the line $x^5$ $x^5$ of Fig. 2. Fig. 6 is a section on the line $x^6$ $x^6$ of Fig. 4. Fig. 7 is a transverse section on the line $x^7$ $x^7$ of Fig. 1, some parts being broken away. Fig. 8 is a detail in section on the line $x^8$ $x^8$ of Fig. 1, some parts being broken away and some parts being shown in full; and Fig. 9 is a plan view of the parts shown in Fig. 8.

The numeral 1 indicates the wheels, the numeral 2 the axle, and the numeral 3 the frame, of a two-wheeled truck. One of the wheels 1 is loose on the axle 2 and the other is connected to rotate therewith. In this way positive rotation is imparted to the said shaft, and at the same time the machine is adapted to readily turn corners, since its two wheels are independently movable. Thills or shafts 4 project forward from the frame 3, and upon the said frame is mounted a barrel-like tank 5, disposed with its axis extending in a horizontal position transversely of the machine. In its upper portion the tank 5 is provided with a receiving spout or neck 6. Working within the tank 5 is an agitating-reel 7, the shaft 8 of which is journaled in suitable bearings 9 on the heads of said tank, projects through one of the said heads, and is provided with a sprocket 10 and a crank 11. A sprocket-chain 12 runs over the sprocket 10 and over a relatively large sprocket 13, which sprocket is loose on the axle 2 and is provided with a half-clutch 14. A slidable half-clutch 15, carried by the axle 2, coöperates with the half-clutch 14 to throw the sprocket 13 and parts driven thereby into and out of action at will. Rigidly secured on the frame 3 below the crank 11 is a double-acting force-pump 16, the piston-rod 17 of which is connected to cross-head straps 18, the lower ends of which work in vertical guides 19, formed on the sides of the cylinder casting or body of the said pump. The lower ends of the cross-head straps 18 are pivotally attached at 20 to the lower ends of a pronged pitman 21, which pitman at its upper end is pivoted to the wrist-pin 11ª of the crank 11.

In the bottom of the tank 5 is an outlet-port 22, from which a tube or pipe 23 extends to the cylinder of the pump 16. A delivery pipe or tube 24 extends from the pump and, as shown, terminates in a pair of nipples 25, supported from the tank 5 by a bearing 26. An overflow or return pipe 27 leads from the pipe 24 back to the upper portion of the tank 5, and in this return-pipe (see Figs. 2 and 4) is a valve-casing 28, through the upper portion of which works an adjusting-screw 29, having at its inner end a spring-pressing head 30. The upper end of the vertical section of the pipe 27 is normally closed by a check-valve 31, that is yieldingly pressed by a spring 32, the tension of which is adapted to be adjustably set by movements of the screw 29 and head 30.

From each nipple 25 a flexible hose 33 extends forward. At their forward ends the hose-sections 33 are in the preferred form of the machine formed with branches 34, which branches are attached to discharge-nozzles or spraying devices 35. These spraying-nozzles 35 are held by oscillating levers 36, that are pivoted at their intermediate portions on set-screws 37, which set-screws are screwed into collars 38. These collars 38 are by the set-screws 37 adjustably held on pipe-sections 39, bolted or otherwise rigidly secured to a transverse front beam 40 of the frame 3. These collars 38 when the set-screws 37 are loosened are adapted to be adjusted laterally or pivotally at will on the said pipe-sections 39. By adjusting them pivotally the nozzles 35 may be adjusted either upward or downward. Furthermore, the supporting-levers 36 may be turned either forward or rearward, so as to project the nozzles 35 either forward or rearward, as desired. The shorter ends of the two levers 36 on the same side of the machine are connected by light wires 41 to the lower end of a foot-lever 42, which is pivoted to the bar 40. At its upper end each foot-lever 42 is formed with a foot-rest 43, with which the foot may be engaged to oscillate said lever, and thereby impart transverse vibratory movements to the nozzles. In Fig. 1 the two nozzles on one side of the machine are shown as turned forward, while the two nozzles on the other side of the machine are shown as turned rearward. In the drawings the driver's seat 44 is shown as applied as a cover to the tank-spout 6.

The operation of the machine is substantially as follows: Under the forward movement of the machine the agitating-reel 7 is kept in motion and keeps the poisonous liquid in the tank thoroughly stirred up. The double-acting pump is of course also kept in continuous motion and pumps a continuous stream of the poisonous liquid to the spraying-nozzles. Any surplus of liquid pumped into the discharge-pipe 24 over that which is discharged from the spraying-nozzles will be driven back into the tank through the overflow-pipe 27, the check-valve 31 of course being forced open to permit such return flow to the tank. It is of course evident that the greater the pressure under which the check-valve 31 is pressed to its seat by the spring 32 the greater will be the pressure under which the liquid will be discharged through the spraying-nozzles. Hence it of course follows that the force under which the liquid will be discharged from the spraying-nozzles may be varied by adjustments of the hand-screw 29. This feature of construction is important. It has already been shown how by the use of the feet on the levers 42 the spraying-nozzles may be oscillated transversely of the machine, so as to thoroughly distribute the poisonous liquid over the plants.

From what has been said it will be understood that the machine described is capable of modification within the scope of my invention as herein set forth and claimed.

The machine described has been put into actual use and has been found to be extremely efficient for the purposes had in view.

What I claim, and desire to secure by Letters Patent of the United States, is as follows:

1. In combination with a truck, and a tank carried thereby, of a reversible nozzle-supporting lever mounted for vertical, pivotal adjustments, and mounted for complete rotary movements in a horizontal plane, when disconnected from its operative mechanism, a nozzle carried by said lever, and a flexible tube connecting said tank with said nozzle, substantially as described.

2. In combination with a truck, and a tank carried thereby, of a plurality of reversible nozzle-supporting levers mounted for vertical, pivotal adjustments, and mounted for complete rotary movements in a horizontal plane when disconnected from its operative mechanism, nozzles carried by said levers, and flexible tubes connecting said tank with said nozzles, substantially as described.

In testimony whereof I affix my signature in presence of two witnesses.

FERDINAND SPLITTSTOSER.

Witnesses:
   E. W. SPLITTSTOSER,
   ED. DAHL.